United States Patent
Brindac et al.

(10) Patent No.: US 7,110,919 B2
(45) Date of Patent: Sep. 19, 2006

(54) FIELD PANEL TRENDING ON EVENT IN A BUILDING CONTROL SYSTEM

(75) Inventors: Christine M. Brindac, Woodridge, IL (US); John M. Skowron, Lindenhurst, IL (US); Nellie Martin, Libertyville, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 0 days.

(21) Appl. No.: 10/878,720

(22) Filed: Jun. 28, 2004

(65) Prior Publication Data
US 2005/0033458 A1 Feb. 10, 2005

Related U.S. Application Data

(63) Continuation-in-part of application No. 10/465,150, filed on Jun. 19, 2003.
(60) Provisional application No. 60/482,599, filed on Jun. 26, 2003.

(51) Int. Cl.
*G06F 11/00* (2006.01)
*G06F 15/00* (2006.01)

(52) U.S. Cl. .............. 702/188; 700/3; 700/4; 700/9; 700/17; 700/19; 700/20; 705/51; 707/10; 707/103; 709/201; 709/217; 713/176; 340/3.1; 702/187

(58) Field of Classification Search ............ 700/2–4, 700/9–12, 17, 19, 20, 96; 702/33, 57, 127, 702/187–189; 705/50, 51; 707/8–10, 102, 707/103; 709/201, 217–219; 713/168–170, 713/176; 340/825, 3.1, 3.9
See application file for complete search history.

(56) References Cited

U.S. PATENT DOCUMENTS

| | | | | |
|---|---|---|---|---|
| 4,905,080 A * | 2/1990 | Watanabe et al. | ............. | 725/14 |
| 5,101,402 A * | 3/1992 | Chiu et al. | ................... | 709/224 |
| 5,463,555 A * | 10/1995 | Ward et al. | .................. | 700/96 |
| 5,936,211 A * | 8/1999 | Kim | .......................... | 187/248 |
| 6,178,362 B1 * | 1/2001 | Woolard et al. | ............ | 700/295 |
| 6,305,605 B1 * | 10/2001 | Goetz et al. | ................ | 235/385 |
| 6,587,945 B1 * | 7/2003 | Pasieka | ..................... | 713/176 |
| 6,598,056 B1 * | 7/2003 | Hull et al. | ............... | 707/104.1 |
| 2004/0167672 A1 * | 8/2004 | McIlhany et al. | | |
| 2004/0210348 A1 * | 10/2004 | Imhof et al. | | |
| 2004/0260431 A1 * | 12/2004 | Keenan et al. | | |

FOREIGN PATENT DOCUMENTS

| JP | 10124580 A | * | 5/1998 |
| JP | 10126860 A | * | 5/1998 |
| JP | 2001331571 A | * | 11/2001 |

* cited by examiner

*Primary Examiner*—Crystal J. Barnes

(57) ABSTRACT

A building control system, such as an HVAC system, has a field unit incorporating a control panel (a field panel) with a local user interface allowing user selected parameters for collecting trend information when the system detects a change of value for a point in the system or a timed instruction in the memory of the field panel to begin collecting trend data for a point. The resulting trend data collected by the field panel can be uploaded to a workstation in the building control system, where the trend data can be formatted into a report, and then digitally authenticated.

25 Claims, 10 Drawing Sheets

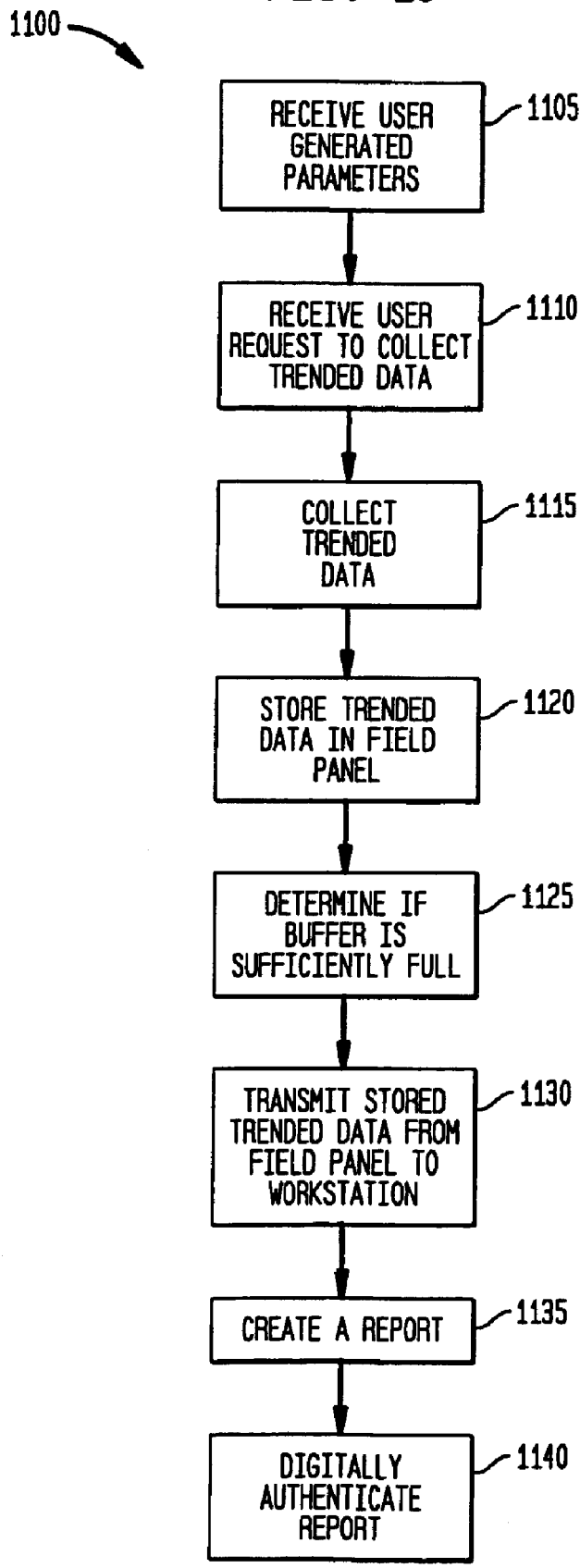

FIELD PANEL TRENDING ON EVENT IN A BUILDING CONTROL SYSTEM

The present invention claims the benefit of U.S. Provisional Patent Application Ser. No. 60/482,599, filed Jun. 26, 2003, which is incorporated herein by reference, and is a Continuation-in-Part of U.S. patent application Ser. No. 10/465,150, filed Jun. 19, 2003, which is incorporated herein by reference.

FIELD OF THE INVENTION

The present invention generally relates to building systems and, more particularly, for selling the parameters for collecting trend data for points in a building control system when COVs (Change-of-Values) or timed trends for points in the system are detected.

BACKGROUND OF THE INVENTION

Building control systems encompass a wide variety of systems that aid in the monitoring and control of various aspects of building operation. Building control systems include security systems, fire safety systems, lighting systems, and heating, ventilation, and air conditioning ("HVAC") systems. In large commercial and industrial facilities, such systems have an extensive number of elements and are highly automated.

The elements of a building control system are widely dispersed throughout a facility. For example, an HVAC system includes temperature sensors and ventilation damper controls as well as other elements that are located in virtually every area of a facility. Similarly, a security system may have intrusion detection, motion sensors and alarm actuators dispersed throughout an entire building or campus. Likewise, fire safety systems include smoke alarms and pull stations dispersed throughout the facility. To achieve efficient and effective building control system operation, there is a need to monitor the operation of, and often communicate with, the various dispersed elements of a building control system.

To this end, building control systems typically have one or more centralized control stations in which data from the system may be monitored, and in which various aspects of system operation may be controlled and/or monitored. The control station typically includes a computer having processing equipment, data storage equipment, and a user interface. To allow for monitoring and control of the dispersed control system elements, building control systems often employ multi-level communication networks to communicate operational and/or alarm information between operating elements, such as sensors and actuators, and the centralized control station.

One example of a building control system control station is the Apogee® Insight® Workstation, available from Siemens Building Technologies, Inc. of Buffalo Grove, Ill., which may be used with the model Apogee® building control system, also available from Siemens Building Technologies, Inc. In this system, several control stations, connected via an Ethernet or another type of network, may be distributed throughout one or more building locations, each having the ability to monitor and control system operation. As a consequence, different people in different locations of the facility may monitor and control building operations.

The typical building control system (including those utilizing the Apogee® Insights Workstation) has a plurality of field panels that are in communication with a workstation. In addition, the building control system also includes one or more field devices, otherwise know as points, connected to the field panels. Each field device is typically operative to measure and/or monitor various building control system parameters.

While the workstation is generally used to make modifications and/or changes to one or more of the various components of the building control system, a field panel may also be operative to allow certain modifications and/or changes to one or more parameters of the system. This typically includes parameters such as temperature and otherwise, set port changes, modify a control program or the like.

In industries that manufacture chemical, semiconductor and pharmaceutical products, for instance, there is a need for controlling the environment in the processing rooms and/or areas. Various manufacturing processes in these industries require strict control of environmental factors. As a consequence, it is often desirable to track changes within the building control system. Additionally, various federal regulations that pertain to these types of manufacturing require monitoring and/or reporting or recording of various parameters associated with the building control system for manufacturing validation. This is accomplished via a building control system trend records and logs.

Typically, such trend records include unnecessary information since known building control systems allow users to create trend records based upon significant Change of Values (COVs) to points and by preselected times, but do not allow further control over how information from points is collected when trending occurs. Accordingly, trend reports commonly include unnecessary information.

It would thus be advantageous to have a field panel that allows a user to further control how trending data from points is collected such that the user can instruct the field panel when to begin and conclude the collection of trend data from a point.

SUMMARY OF THE INVENTION

The subject invention provides field panel trending event in a building control system. The trend application of the subject invention will be made configurable to allow users to trigger the start and stop of data collection from points. This will allow for improved troubleshooting and the filtering of records to only relevant data.

In one form, the subject invention is a method of operating a building control system. The method includes the steps of (a) receiving user generated parameters for collecting trend data at a field panel of the building control system (b) storing trended data collected by the field panel regarding the user generated parameters at the field panel and (c) transmitting the stored trended data regarding the user generated parameters at the field panel to the workstation.

In another form, the subject invention is a building control system. The building control system includes a workstation, a field panel in communication with the workstation wherein the field panel is operative to receive user generated parameters for collecting trend data at a field panel of the building control system, store trended data collected by said field panel regarding said user generated parameters at the field panel, and transmit the stored trended data regarding the user generated parameters at the field panel to the workstation.

In all forms, the subject invention eliminates the collection of unnecessary trending data in reports about the performance of one or more points in a building control system. Moreover, the subject invention provides for digital authentication of such reports for validating certain products such as pharmaceuticals, especially under federal regulations such as 21 CFR §11.

The above-described features and advantages, as well as others, will become more readily apparent to those of ordinary skill in the art by reference to the following detailed description and accompanying drawings.

BRIEF DESCRIPTION OF THE DRAWINGS

FIG. 10 is a flow diagram of another exemplary manner of doing something related to the subject invention.

DETAILED DESCRIPTION

Figure 1:
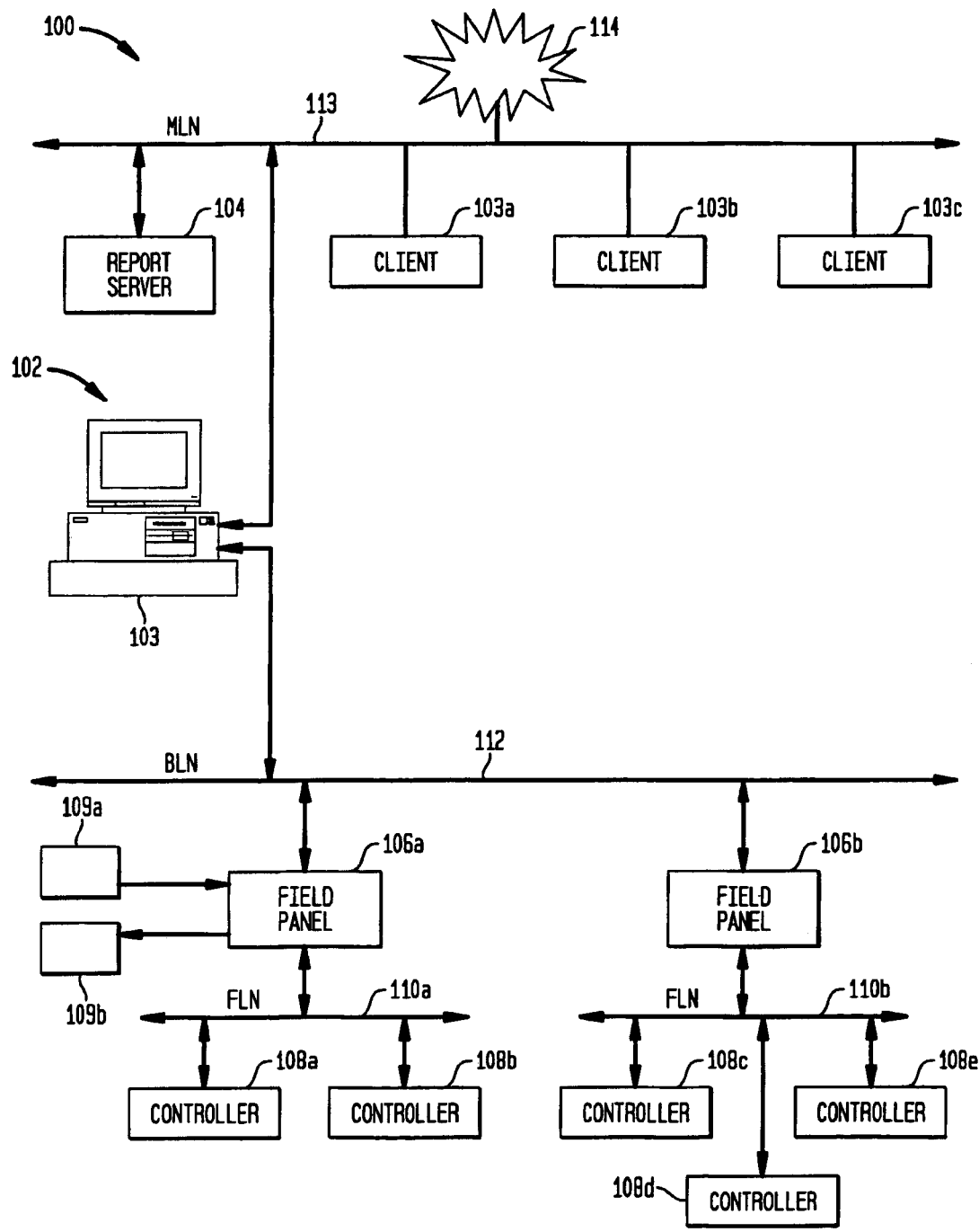
FIG. 1 shows a block diagram of an exemplary building control system in which the principles of the subject invention are utilized.

FIG. 1 depicts a system block diagram of an exemplary building control system (BCS) 100 in which the subject invention may be used. The building control system 100 is depicted as a distributed building system that provides control functions for any one of a plurality of building operations. Building control systems may thus include HVAC systems, security systems, life or fire safety systems, industrial control systems and/or the like. An example of a BCS is the APOGEE® system available from Siemens Building Technologies, Inc. of Buffalo Grove, Ill. The APOGEE® system allows the setting and/or changing of various controls of the system, generally as provided below. It should be appreciated that the building control system 100 is only an exemplary form or configuration for a building control system. Therefore, the principles of the subject invention are applicable to other configurations and/or forms of building control systems.

The building control system 100 includes at least one supervisory control system or workstation 102, client workstations 103a–103e, report server 104, a plurality of field panels represented by field panels 106a and 106b, and a plurality of controllers represented by controllers 108a–108e. It will be appreciated, however, that wide varieties of BCS architectures may be employed.

Each of the controllers 108a–108e represents one of plurality of localized, standard building control subsystems, such as space temperature control subsystems, lighting control subsystems, or the like. Suitable controllers for building control subsystems include, for example, the model TEC (Terminal Equipment Controller) available from Siemens Building Technologies, Inc., of Buffalo Grove, Ill.

To carry out control of its associated subsystem, each controller 108a–108e connects to one or more sensors and/or actuators, also known as points, shown by way of example as the sensor 109a and the actuator 109b connected to the controller 108a.

Typically, a controller such as the controller 108a effects control of a subsystem based on sensed conditions and desired set point conditions. The controller controls the operation of one or more actuators to attempt to bring the sensed condition to the desired set point condition. By way of example, consider a temperature control subsystem that is controlled by the controller 108a, where the actuator 109b is connected to an air conditioning damper and the sensor 109a is a room temperature sensor. If the sensed temperature as provided by the sensor 109a is not equal to a desired temperature set point, then the controller 108a may further open or close the air conditioning damper via actuator 109b to attempt to bring the temperature closer to the desired set point. Such systems are known. It is noted that in the BCS 100, sensor, actuator and set point information may be shared between controllers 108a–108e, the field panels 106a–106b, the work station 102 and any other elements on or connected to the BCS 100.

To facilitate the sharing of such information, groups of subsystems such as those connected to controllers 108a and 108b are typically organized into floor level networks ("FLNs") and generally interface to the field panel 106a. The FLN data network 110a is a low-level data network that may suitably employ any suitable proprietary or open protocol. Subsystems 108c, 108d and 108e along with the field panel 106b are similarly connected via another low-level FLN data network 110b. Again, it should be appreciated that wide varieties of FLN architectures may be employed.

The field panels 106a and 106b are also connected via a building level network ("BLN") 112 to the workstation 102 and the report server 104. The field panels 106a and 106b thereby coordinate the communication of data and control signals between the subsystems 108a–108e and the supervisory computer 102 and report server 104. In addition, one or more of the field panels 106a, 106b may themselves contain terminal equipment controllers, such as ventilation damper controllers or the like. To this end, as shown in FIG. 1, the field panel 106a is operably connected to one or more terminal devices, shown for example as a sensor 109a and an actuator 109b.

The workstation 102, which is a user access point for the system components (including the field panels 106a and 106b), is operative to accept modifications, changes, alterations and/or the like ("workstation events") from the user. This is typically accomplished via a user interface for or of the computer 102. The user interface may be the keyboard 103 of the workstation 102. The workstation 102 is operable to, among other things, affect or change operational data of the field panels 106a, 106b as well as other components of the BCS 100. The field panels 106a and 106b utilize the data and/or instructions from the workstation 102 to provide control of their respective controllers.

The workstation 102, which is a user access point for the system components (including the field panels 106a and 106b), is operative to accept modifications, changes, alterations and/or the like ("workstation events") from the user. This is typically accomplished via a user interface for or of the computer 102. The user interface may be the keyboard 103 of the workstation 102. The workstation 102 is operable to, among other things, affect or change operational data of the field panels 106a, 106 as well as other components of the BCS 100. The field panels 106a and 106b utilize the data and/or instructions from the workstation 102 to provide control of their respective controllers.

The workstation 102 is also operative to poll or query the field panels 106a and 106b for gathering data. The workstation 102 processes the data received from the field panels 106a and 106b, including trending data. Information and/or data is thus gathered from the field panels 106a and 106b in connection with the polling, query or otherwise, which the workstation 102 stores, logs and/or processes for various uses. To this end, the field panels 106a and 106b are operative to accept modifications, changes, alterations and/or the like ("field panel events") from the user.

The workstation 102 also preferably maintains a database associated with each field panel 106a and 106b. The database maintains operational and configuration data for the associated field panel.

The supervisory computer or workstation 102 is operatively connected to a web server 114 and other supervisory computers, not shown, via the MLN 113 that may suitably be an Ethernet. The supervisory computer 102 uses the MLN 113 to communicate BCS data to and from other elements on the MLN 113, including the web server 114. The report server 104 stores historical data, trending data, error data, system configuration data, graphical data and other BCS system information as appropriate.

The MLN 113 may connect to other supervisory computers, not shown, Internet gateways including, by way of example, the web server 114, or other gateways to other external devices, not shown, as well as to additional network managers (which in turn connect to more subsystems via additional low level data networks). The MLN 113 may suitably comprise an Ethernet or similar wired network and may employ TCP/IP, BACnet, and/or other protocols that support high speed data communications.

The field panels 106a and 106b are operative to store and upload to the workstation trending data about points in the system 100 with respect to objects defined by the BCS 100. The objects are various parameters, control and/or set points, port modifications, terminal definitions, users, date/time data, alarms and/or alarm definitions, modes, and/or programming of the field panel itself, another field panel, and/or any controller in communication with a field panel. The trending information that is uploaded to the workstation 102 for each device depends upon the user's instructions to the system. The user can instruct the field panel 106a to begin trending for a point once the system detects a Change of Value (COV), which indicates the condition of a point has substantially changed. The system can also be programmed to begin collecting trending information based upon a period of time selected by a user. In accordance with the preferred embodiment of the present invention, the system will collect trend data based upon parameters set by the user using trigger points, which allows users to trigger the start and stop of data collection from system points. Trigger points are discussed in greater detail below.

It should here be appreciated that for the below discussion when appropriately referring to FIG. 1, the functionality, features, attributes, characteristics, operation and/or the like of each field panel is the same for every field panel except where indicated, and will be described as such with reference to only field panel 106a. Therefore, the below discussion with reference to field panel 106a is equally applicable to all field panels unless indicated otherwise.

Figure 2:
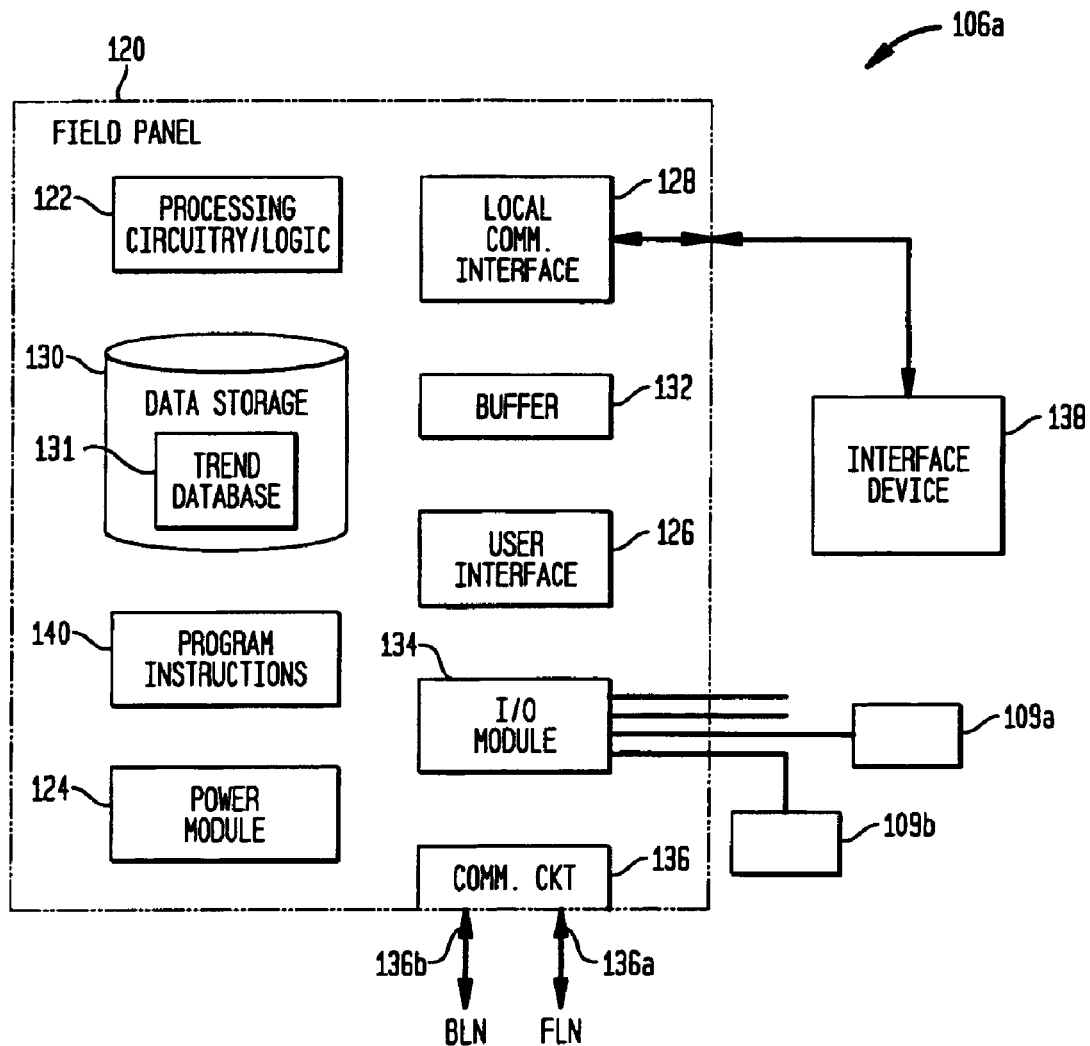
FIG. 2 is a block diagram of an exemplary field panel/control unit incorporating the principles of the subject invention.

FIG. 2 presents a block diagram of an exemplary embodiment of the field panel 106a. It should be appreciated that the embodiment of the field panel 106a is only an exemplary embodiment of a field panel in which the subject invention may be utilized. As such, the exemplary embodiment of the field panel 106a of FIG. 2 represents all manners or configurations of field panels that are operative in the manner set forth herein.

The field panel 106a includes a housing, cabinet or the like 120 that is configured in a typical manner for a building control system field panel. The field panel 106a includes processing circuitry/logic 122 that is operative, configured and/or adapted to operate the field panel 106a including the features, functionality, characteristics and/or the like as described herein. To this end, the processing circuit 122 is operably connected to all of the elements of the field panel 106a described below. The processing circuitry/logic 122 is typically under the control of program instructions or programming software or firmware 140. Program instructions 140 includes trending software which performs trending functions for the field panel 106a. The trending software will instruct processing circuitry 122 to operate the field panel 106a to collect trend data from points in system 100. The trending software will collect operator selected data, generate the desired trend information and distribute the trend data to the interface 126 or 128 and storage 130. The trending software in program instructions 140 has been made configurable to allow users to trigger the start and stop of data collection from points in system 100. The trending software will preferably be able to collect trend data at specified times, such as every hour in the hour. In a preferred embodiment, the trending software will allow the user to create trigger points which allow the user to set parameters for when trend data is collected, so that the user can filter the trend data collected. For example, using the present invention, the parameters could be set such that data trending for one or more points in an office building begins at the beginning of a workday in the building and ends at the conclusion of the workday in the building.

In the present invention, there are several conditions under which the trending software in program instructions 140 will command trending to occur. One condition is when an alarm condition for a point is detected. In this circumstance, the field panel 106a would only collect trending data for a point when it has detected an alarm condition for the point. Another condition is an alarm condition of another point. If one point goes into an alarm, than the trending software in program instructions 140 can instruct the field panel 106a to start collecting trending data for one or more points associated with the point in alarm, and may also collect trending data for the point that is in alarm as well. Another option is to trend a point only when it's at a specified value or range. In one embodiment, the user can write code, such as in program instructions 140, that would monitor the condition of the BLN 112. For example, if a link is missing in the BLN 112, the program instructions 140 will instruct the field panel 106a to begin trending data. By modifying the program instructions 140, the user can come up with various methods of collecting trend data.

The field panel 106a also includes a power module 124 that is operative, adapted and/or configured to supply appropriate electricity to the field panel 106a (i.e. the various components of the field panel). The power module 124 preferably operates on standard 120 volt AC electricity, but may operate on 24 volt AC electricity or include DC power supplied by a battery or batteries.

An input/output (I/O) module 134 is also provided in the field panel 106a. The I/O module 134 includes one or more input/output circuits that communicate directly with terminal control system devices such as actuators and sensors. Thus, for example, the I/O module 134 includes analog input circuitry for receiving analog sensor signals from the sensor 109a, and includes analog output circuitry for providing analog actuator signals to the actuator 109b. The I/O module 134 typically includes several of such input and output circuits.

The field panel 106a further includes a digital communication port circuit 136. The digital communication port circuit 136 allows for communication to the controllers 108a and 108b as well as other components on the FLN 110a, and furthermore allow for communication with the workstation 102, other field panels (e.g. field panel 106b) and other components on the BLN 112. To this end, the digital communication port circuit 136 includes a first port 136a, which may suitably be a RS-485 standard port circuit, that is connected to the FLN 110a, and a second port 136b, which may also be an RS-485 standard port circuit, is connected to the BLN 112.

The field panel 106a may also be accessed locally. To facilitate local access, the field panel 106a includes a local communication interface 128 and an interactive user interface 126. The local communication interface 128 provides a connection to a local interface device 138. Using interface 126 or interface device 138 the user may control the collection of trending data from devices such as sensor 109a and actuator 109b. The interface device 138 may be temporarily connected to the field panel 106a for the purpose of sending data to the field panel and/or acting as a user-interface for the field panel 106a. The interface device 138 may be a computer such as a portable notebook computer.

The user interface 126 of the field panel 106a includes devices the display data and receive input data that are permanently affixed to the 120, as opposed to being portable and moveable. The user interface 126 may suitably include an LCD type screen or the like, and a keypad. The user interface 126, if provided, is operative, configured and/or adapted to both alter and show information regarding the field panel 106a, such as status information, and/or other data pertaining to the operation, function and/or modifications or changes to the field panel 106a.

The field panel 106a also includes a buffer 132, which is preferably a circular buffer. The buffer 132 is operative, configured and/or adapted to temporarily store data or information for the field panel 106a. The buffer 132 may be a random access memory (RAM) buffer or other type of device that temporarily stores data/information and allows the retrieval of the stored data. Using the interface 126 or 128, the user can define the memory portion of the circular buffer 132 the user wishes to use to temporarily store trend data. If the user wishes to allocate just a small portion of the buffer 132 for storing trend data, then the buffer 132 will keep overwriting itself. Data is uploaded to the workstation 102 from buffer 132 when a user requests the trend data to be uploaded. For example, using interface 126 or 128, the user can request that the data be uploaded from the field panel 106a to the workstation 102 once a certain portion of the buffer 132, or all of the buffer 132, is full. In one embodiment, the user can choose to use anywhere from 1% to 80% of the buffer 132 for storing trend data before the trend data is uploaded from the field panel 106a to the workstation 102. Essentially, the field panel 106a calculates that it is being archived for uploading. In another embodiment, the system will be able to predict when the buffer 132 will fill up, and schedule the workstation 102 to collect data from the buffer 132 in the field panel 106a accordingly. The field panel 106a can also be programmed such that an upload to the workstation 102 is triggered for time based trends.

The field panel 106a also includes a data storage device 130 that is operative, configured and/or adapted to store point data and trend data. In the embodiment described herein, the data storage device 130 comprises a trend database 131 for storing the object information discussed below. Accordingly, in a preferred embodiment, the trend database 131 is an object oriented database. In an alternative embodiment, a relational database could be used instead of an object oriented database.

Figure 3:
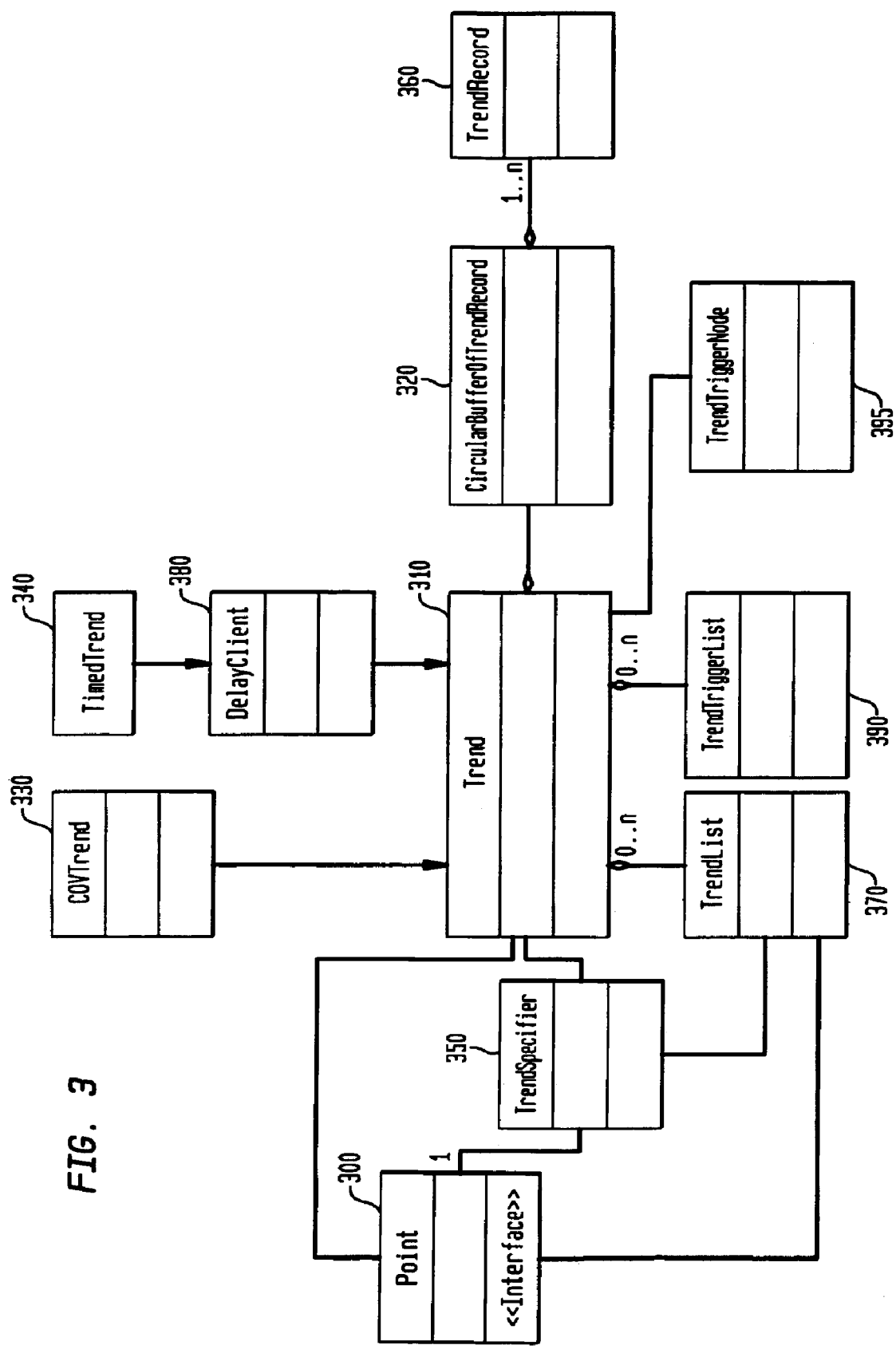
FIG. 3 is a diagram of the trend subsystem of the present invention.

Referring now to FIG. 3, FIG. 3 is a diagram of the trend subsystem of the present invention. According to the present invention, the trend information about the system 100, such as point objects 300 and trend data, is stored in trend database 131. The Point class 300 is a class for storing information about a point in a system 100. Each point in system 100 is represented by a Point class 300.

Trend class 310 is a base class for all types of trends. Trend class 310 contains a CircularBufferOfTrendRecord class 320. This class manages circular buffer 132 having any number of records. Only two operations are supported by the circular buffer class: insertion of new records, and extraction of records from the buffer. Classes derived from the Trend class 310 modify properties of class 320. For example, the COVTrend class 330 places requirements on the range of COV's that may cause a sample to be recorded. The TimedTrend class 340 causes trend samples to be collected when a timer expires.

The class TrendSpecifier 350 is a container for the parameters used to specify a trend. This class is used to specify trends in the field panel 106a. These parameters include number of samples, trend type (COV or Timed), and additional data dependant upon the trend type. The TrendSpecifier class 350 is used to specify the creation, deletion, and selection of a trend from a set of trends.

The TrendRecord class 360 stores the data for each trend sample. The TrendRecord class 360 contains the actual sample of data. This class is used to store trend data in the field panel 106a. This data includes the date and time of the sample, the logical value and priority of the point, and several status flags, such as alarm and failure status.

The class TrendList 370 manages of set of trends for each point. In a preferred embodiment, there are multiple ways a point can be trended, whether by COV or time. An object of the class TrendList 370 is contained by each Point class 300. The Point class 300 uses the methods of the TrendList 370 as an interface to individual Trend objects 310. The trend in question is specified by an object of the TrendSpecifier class 350.

The class TimedTrend 340 is derived from both the Trend class 310 and the DelayClient class 380. The DelayClient class 380 allows the DELAY task of the field panel 106a to periodically update the Trend class 310 by calling the TimerExpiration function. The TimedTrend object 340 is chained onto the DELAY task list of clients. The task will collect trend samples at the interval specified by the trend specification in Trend Class 310.

The class COVTrend 330 records a sample each time a significant change occurs to a point. In the field panel 106a, a sample would be recorded at each time the point declared a value, priority or status COV. When any status or priority of the point changes, a COV is declared by the point. The COVTrend class 330 preferably records a trend in this condition. The COVTrend class 330 may be configured to handle data COVs in one of two ways. The point's COV limit may be used as the data COV trigger. In this case, the point's declaration of data COV will cause recording of a sample. A second type of COV trend allows each COV to trend to be configured with a unique COV limit. In this case, the Trend class 310 must determine whether a significant change (since the last recorded sample) has occurred.

In a preferred embodiment, the present invention further includes TrendTriggerList class 390 which is provided to create a list of trigger points. The TrendTriggerList class 390 is a basic linked list. It can perform, add, remove, and update a TrendTriggerNode class 395. Trend class 310 is provided with a TrendTriggerNode attribute. Trend class 310 uses the attribute to link the trigger list in TrendTriggerList class 390 togeather. The address of each TrendTriggerNode class 395 is stored in Trend class 310. This basic linked list gets built when the user creates the trend definition with the addition of the trigger point. The trigger point will be characterized (if resolved in the database 131) before it is added to the list.

To characterize the trigger point in TrendTriggerList class 390, the Trend class 310 should contain a handle. If the trend database 131 in a field panel 106a can connect the application to the trigger name and suffix name successfully, the handle is mapped and the trigger list is created. Accordingly, the reference (memory address) of the TrendTriggerNode class 395 is added to the TrendTriggerList class 390. If the attempt fails, the trigger name is marked unresolved.

All of the point types available in the system must call the TrendTriggerList class 390 update function whenever a change of value is incurred. The TrendTriggerList class 390 update will determine if any action is required on said point. Any time a trigger point changes, the TrendRecord class 360 is marked. The trigger point is not trended unless the user adds a TrendRecord class 360 for it. The trigger firing will record the current status of the trend point.

Figure 4:
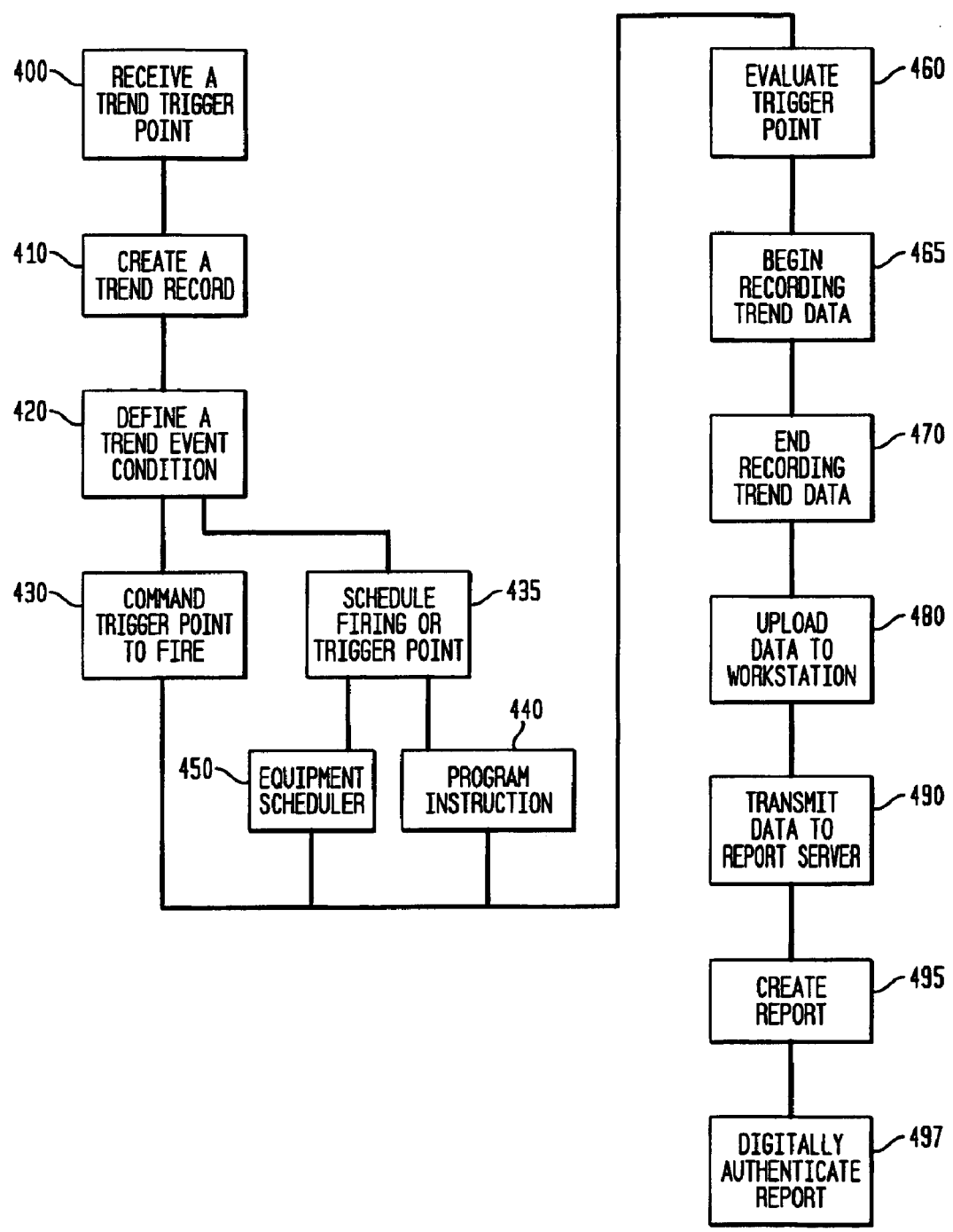
FIG. 4 is a flow diagram of an exemplary manner of doing something related to the subject invention.

FIG. 4. shows one manner in which a user can configure a trigger point to cause the trend application in program instructions 140 to instruct processing circuitry 122 to cause the field panel 106a to begin collecting trending data for a point, represented by object 300 in FIG. 3, in system 100 corresponding to the trigger point. As shown in FIG. 4, using user interface 126 provided in field panel 106a, the user in step 400 can create trending on event by first supplying the field panel 106a with an event trigger point, which will be contained in TrendTriggerList class 390 once the user has associated the trigger point to a trend point. The user may indicate the desire for triggered operations and name the trigger point. The trigger point, as previously discussed, is a trigger that instructs the field panel when to begin and end the collection of data based upon the occurrence of a predetermined event. In step 410, using user interface 126, the user can then setup a TrendRecord class 360 which uses the trigger point created in step 400. In step 420, again using interface 126, the user may define the trend event condition, whether it be OFF (do not record trend data), ON (begin normal trend collection), or ALARM (only record data when the status of the point equals an alarm). These states can be determined by the user for data filtering, for there may be times when a COV or a timed trend is detected when a user does not want trending data to be collected.

In step 430, using user interface 126, the user has the option of commanding the trigger point manually, causing the program instructions 140 to instruct the processing circuitry 122 to cause the field panel 106a to begin collecting trending data for a point. In the alternative, in step 435, the user has the option to schedule when the trigger point in TrendTriggerPoint 390 is used to trigger the collection of trend data by the field panel. Again, using user interface 126, if the user wishes to schedule when the trigger point in TrendTriggerList 390 is initiated, the user can either program code in program instructions 140, as shown in step 440, or use an equipment scheduler to instruct a trigger point when to turn on and when to turn off, as shown in step 450. The equipment scheduler is an application designed to provide constant, time-based control of a space in a facility. Just as the equipment scheduler is capable of scheduling the operation of points in the system, it can control when trending information about such points is collected.

In step 460, the trend application in program instructions 140 monitors the trigger point, when supplied, to start and stop data recording. If a trigger point is not supplied, the point named in the trend record will begin recording samples as normal trending operations dictate, that is, without any filtering. The trend application will only respond to the state text string of the trigger point (ON, OFF, ALARM) discussed in step 420. The trend application in program instructions 140 looks at the value of the trigger point to decide what state the trigger point is in, whether 0=Off, 1=ON, or 2=Alarm. The state text table of the trigger point must have at least one of these strings otherwise it will be marked unresolved. The user can use any state text table they desire. The trend application in program instructions 140 requires values of 0,1,2 for the trigger. Any values outside that range cause the trigger point to fail and the trend application in program instructions 140 defaults to a no trigger state, or in other words, pretends the trigger is OFF. A new state text table will be supplied in the field panel with matching text to ease setup. An unresolved event trigger point will force the trend application in program instructions 140 to ignore the trend by event flag and operate as if the point did not have an associated trigger (begin marking samples as the existing application dictates).

In step 465, if the trend application in program instructions 140 determines based upon the trigger point in TrendTriggerList 390 that data collection should begin, program instructions 140, using processing circuitry 122, will instruct the field panel 106a to begin collecting data in buffer 132.

In step 470, if the trend application in program instructions 140 determines based upon the trigger point in TrendTriggerList 390 that data collection should end, program instructions 140, using processing circuitry 122, will instruct the field panel 106a to end collecting data in buffer 132.

In step 480, the trending data stored in buffer 132 is uploaded to the workstation 102 from buffer 132 when a user requests the trend data to be uploaded. As discussed above, a user has several options for instructing the field panel 106a to upload trend data from the buffer 132 to the workstation. For example, using user interface 126, the user can instruct the field panel 106a to upload trend data in buffer 132 to the workstation 102 when the buffer 132 is a certain percentage full.

In step 490, the report server 104 takes the uploaded data from the workstation 102 and stores the data in database 940 for future report generation. In step 495, the report server creates a report. In step 497, the report may then be digitally authenticated using known digital authentication and digital signature software located on client 103a–103e or report server 104.

Figure 5:
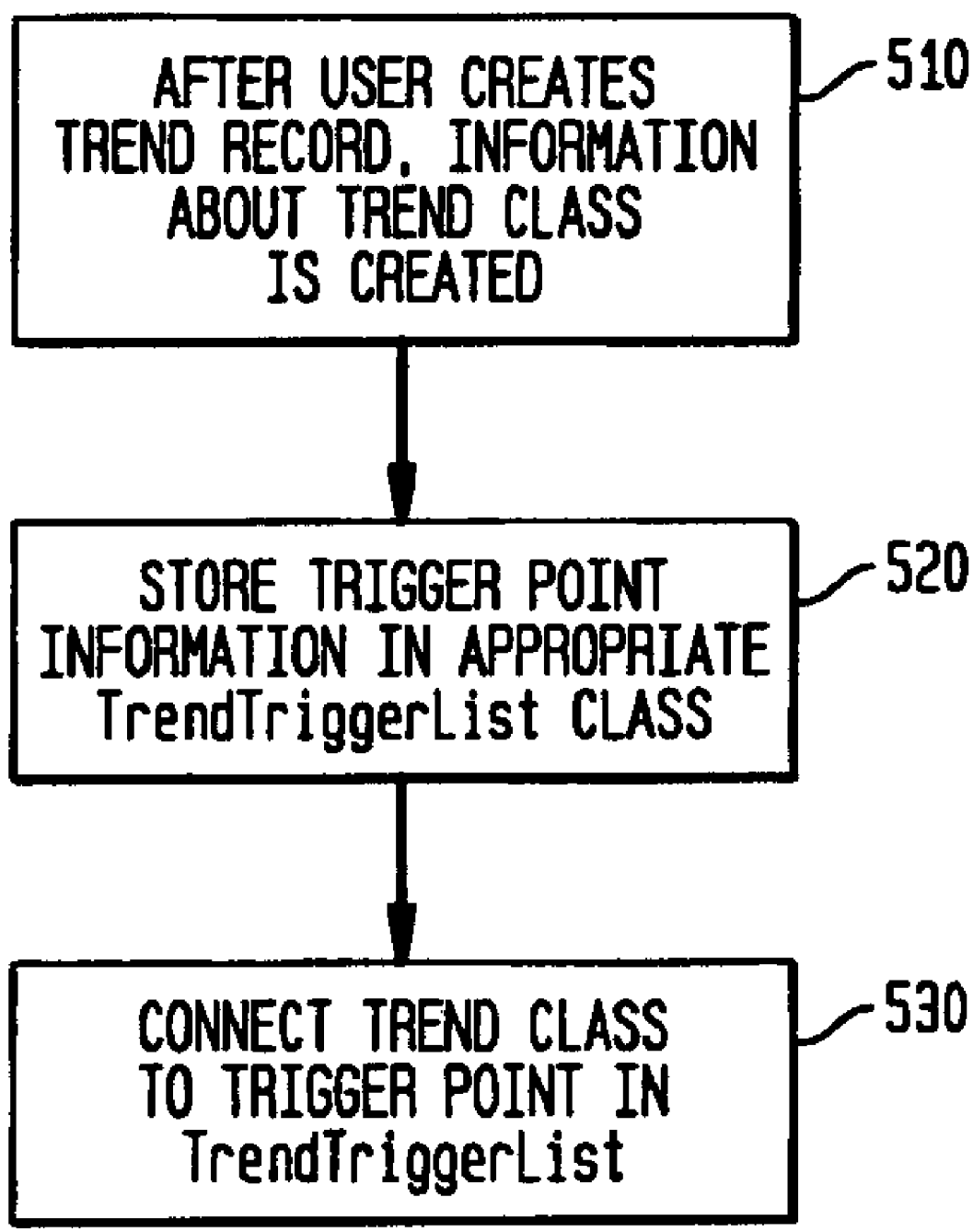
FIG. 5 is a flow diagram of an exemplary manner of doing something related to the subject invention.

Turning now to FIG. 5, FIG. 5 shows how the TrendTriggerList class 390 shown in FIG. 3 is connected to its Trend class 310 when a trigger point is created for a point in system 100. FIG. 5 shows an exemplary method 500 for providing a Trend class 310 the address of the associated TrendTriggerList class 390 from the trend database 131. In step 510, when the user enters a TrendRecord class 360 into trend database 131, information about the trend class 310 is gathered, and the address of the point the user wishes to trend is then provided to the trend database 131. At this point, the Trend class 310 has a pointer to the point in the trend database 131 that is trended. In step 520, the trend database 131 validates the request and then calls a function where the trigger point information is then stored in the appropriate TrendTriggerList class 390. If the user requested that the Trend Record class 360 be COV driven, the Trend class 310 is then associated with the TrendTriggerList class 390. In step 530, the trend database 131 in the field panel 106a then attempts to connect the Trend class 310 to the trigger name and suffix name correctly of the trigger point in TrendTriggerList class 390 so that the handle is mapped and the TrendTriggerNode class 395 is added to the Trend Glass 310. The Trend class 310 accordingly contains a TrendTriggerNode class 395 which is its reference to the TrendTriggerList class 390. The TrendTriggerNode class 395 starts out as a void pointer (empty reference) that's waiting to be added to. The TrendTriggerNode class 395 is part of a linked list data structure. The TrendTriggerNode class 395 keeps the pointer to the next item in the TrendTriggerList class 390. When field panel 106a searches for trigger data, nodes in the TrendTriggerList class 390 are searched to find the desired point reference.

Figure 6:
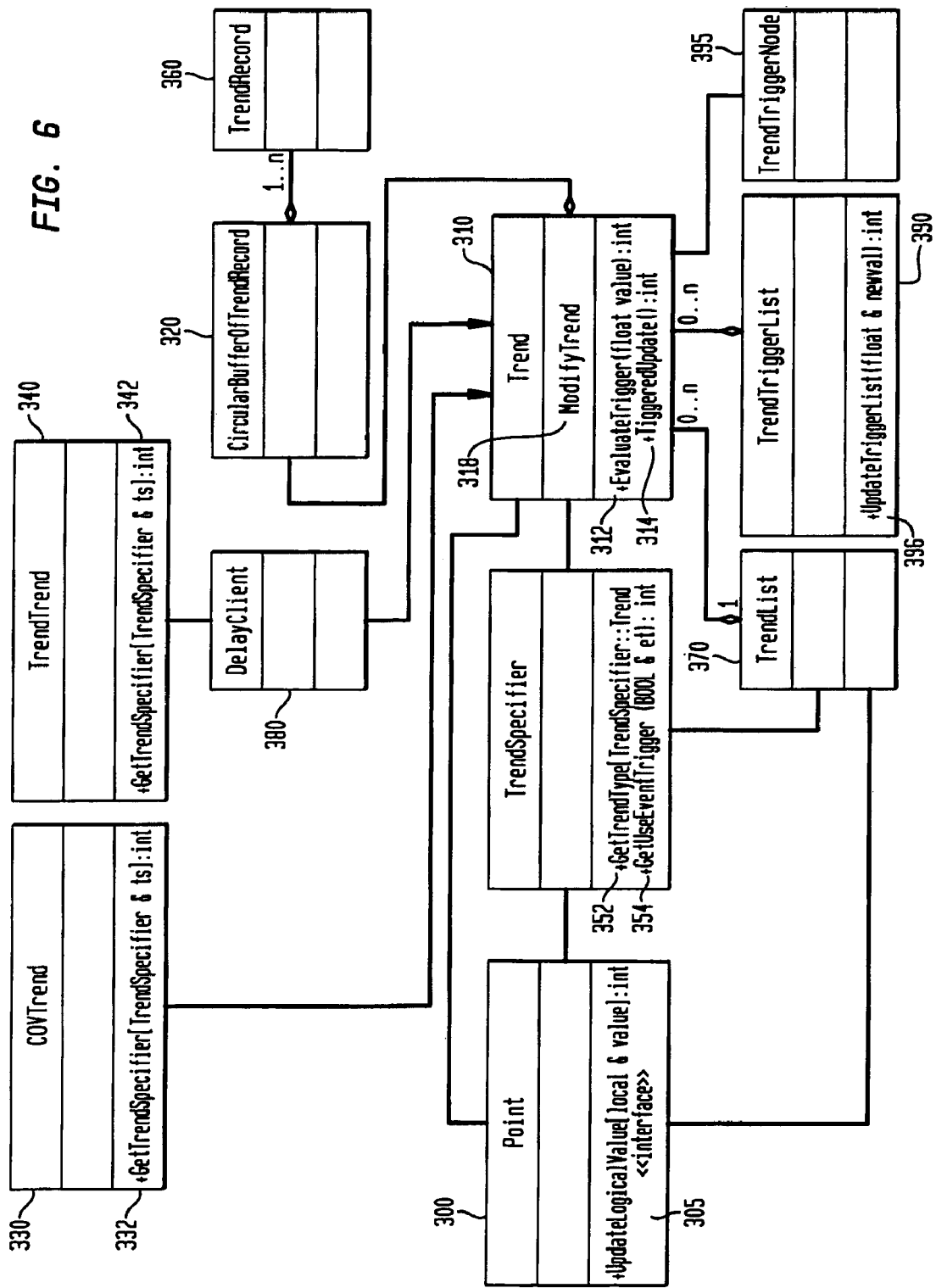
FIG. 6 is another diagram of the trend subsystem of the present invention.

FIG. 6 next shows how trending on event is executed when field panel 106a detects a COV for a point controlled by field panel 106a. The steps below are used to keep track of trigger changes and to mark Trend class 310 with a change notification if necessary. When a COV is detected by field panel 106a, the trigger list in TrendTriggerList class 390 will be evaluated to determine if the trigger point has changed, since a COV could have occurred on a trend point or a trigger point. The field panel 106a makes this determination and mark the trend if appropriate. Every Point class 300 in the system has a function called UpdateLogicalValue 305 which is invoked anytime a COV has occurred. When a COV is detected by the field panel 106a, the field panel 106a begins by looking at the TrendTriggerList class 390. For each Point class 300 being trended, each Point class 300 can have multiple trends in Trend 310 to be looked at and can have multiple trigger points in TrendTriggerList 390.

Using the function UpdateTriggerList 396, the field panel 106a will look at the TrendTriggerList class 390 to see if one or more trigger points in the TrendTriggerList class 390 should be fired. That is, the field panel 106a determines if the COV that occurred is one of the points in the TrendTriggerList class 390. If a relevant trigger point is found, the function Evaluate Trigger 312 in Trend class 310 will look at the value of the trigger point and then mark a flag in the Trend class 310 to keep track of what the state of the trigger is (ON, OFF or ALARM). Next, the function Triggered Update 314 in Trend class 310 places a mark in Trend class 310. The mark shows the current time, the point name that is trended, and its current value. This mark is a trend indicator, it forces a trend sample to tell the user the time the trigger has changed.

Next, the function GetTrendSpecifier 332 will either go into the COVTrend class 330 or TimedTrend class 340. This function retrieves information about how the trend is specified, such as sample time, number of samples etc. by using GetTrendSpecifier 342. Next, the function GetTrendType 352 in TrendSpecifer class 350 will determine the trend type, whether it is a COV or a timed trend. In this step, the TrendSpecifier class 350 is queried to find out if it is a timed trend or a COV trend. Next, the function GetUseEventTrigger 354 in the TrendSpecifier 350 will query the TrendSpecifier class 350 to determine if the trend is active. If it is determined that the trend type is a timed trend and the trigger is enabled, the function ModifyTrend 318 in Trend class 310 is called to resynchronize the TrendReport class 360 based on the current time and the sample rate.

Figure 7:
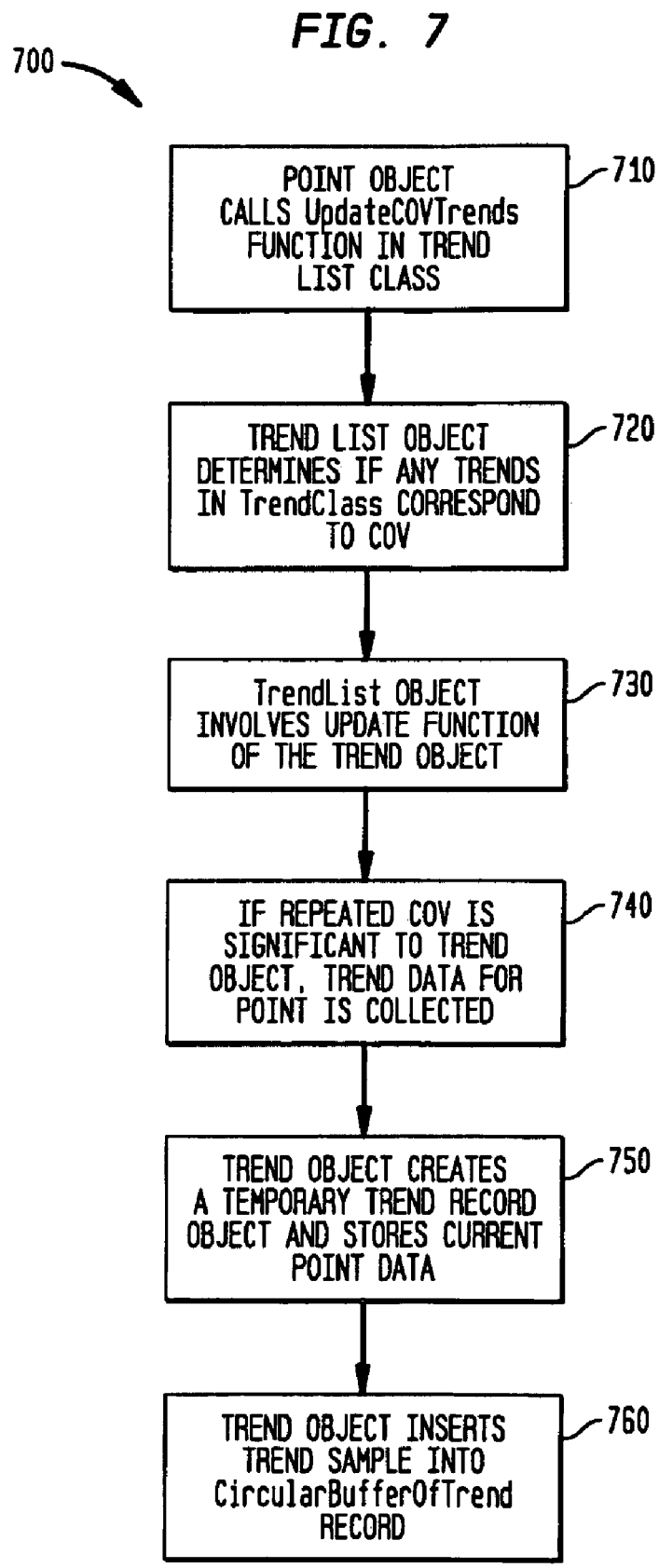
FIG. 7 is a flow diagram of another exemplary manner of doing something related to the subject invention.

Referring now to FIG. 7, there is depicted another flowchart, generally designated 700, of an exemplary manner of operation of the subject invention. It should be appreciated that the manner of operation depicted in the flowchart 700 of FIG. 7 is only exemplary of one manner in which the subject invention functions. Other manners, as well as additional steps, less steps, or modified steps constitute valid functioning of the subject invention in accordance with the present principles.

FIG. 7 discloses how in the present invention COVs are recognized and stored in a trend. In step 710, the point object 300 calls the UpdateCovTrends function of the TrendList 370 class. This function is called whether or not the point is declaring a COV. Next, in step 720, the TrendList class 370 iterates on its list of Trend class 310, and determines if any trends in Trend class 310 correspond to the COV. If the call returns false, the iteration continues with the next trend. Otherwise, execution continues with the following step. In step 730, the TrendList class 370 invokes the update function of the Trend object 310. Next, in step 740, if the reported COV is significant to this Trend class 310, the current data of the Point object 300 are collected. Next, in step 750, if the Trend object 310 creates a temporary TrendRecord class 360 and stores the current Point data. Then, in step 760, Trend class 310 inserts the trend sample into the CircularBufferOfTrendRecord class 320

Figure 8:
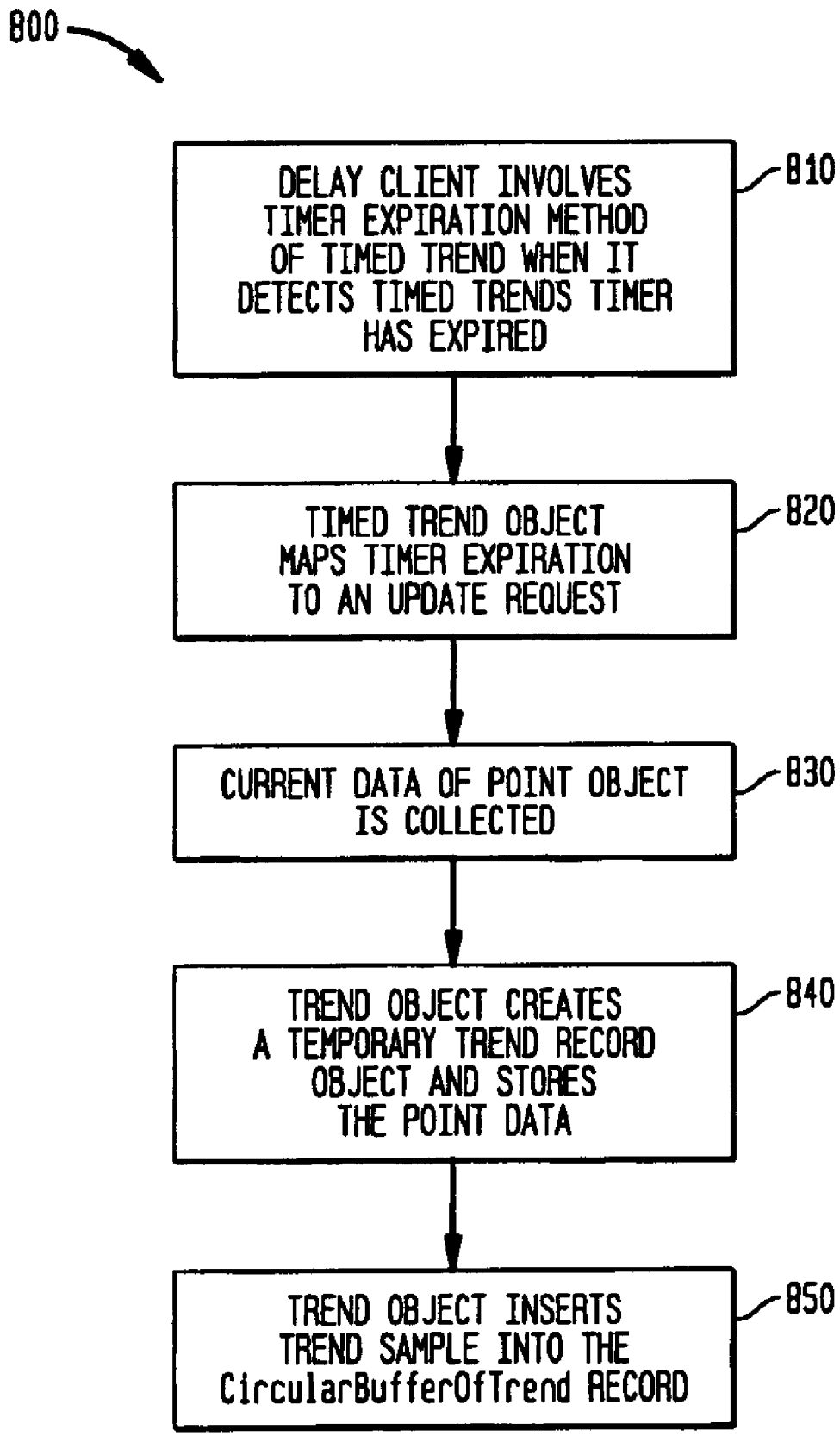
FIG. 8 is a flow diagram of another exemplary manner of doing something related to the subject invention.

Referring now to FIG. 8, there is depicted another flowchart, generally designated 800, of an exemplary manner of operation of the subject invention. It should be appreciated that the manner of operation depicted in the flowchart 800 of FIG. 8 is only exemplary of one manner in which the subject invention functions. Other manners, as well as additional steps, less steps, or modified steps constitute valid functioning of the subject invention in accordance with the present principles.

Turning now to FIG. 8, this figure illustrates how in the present invention how a timed trend is updated. In step 810, When the DelayClient 380 detects that the TimedTrend class 340 timer has expired, it invokes the TimerExpiration method of the TimedTrend class 340. In step 820, The TimedTrend class 340 maps the timer expiration to an Update request. Next, in step 830, the current data of the Point class 300 is collected. Next, in step 840, the Trend class 310 creates a temporary TrendRecord class 360 and stores the current point data. Then, in step 850, the Trend class 310 inserts the trend sample into the CircularBufferOfTrendRecord class 320.

Figure 9:
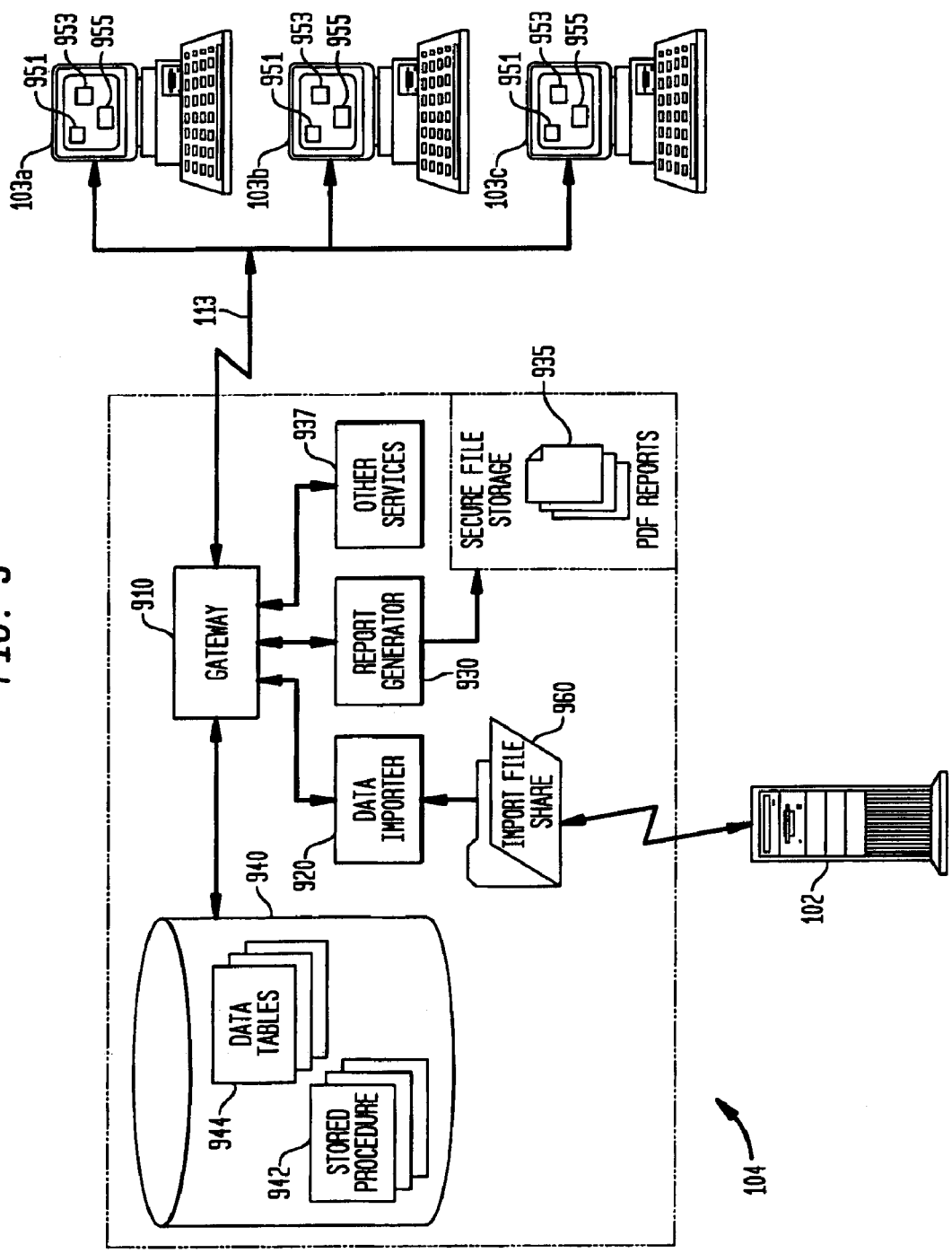
FIG. 9 is a block diagram of an exemplary report server of an exemplary building control system in which the principles of the subject invention are utilized.

FIG. 9 represents a block diagram of an exemplary embodiment of the report server 104 and its operational relationship to workstation 102 and clients 103a–103e. As shown in FIG. 9, report server 104 is comprised of gateway 910. Gateway 910 manages server services such as data importing through data importer 920, report generation through report generator 930, as well as other services 937. Such services may include data exporting, data archiving and data purging. Such services may also include scheduled report printing. As part of scheduled reporting, a report can be sent to a print local to workstation 102 or somewhere in facility management system 100. Another service may include calculating summary point values. Summary points are points that take regular points to calculate other values, like minimum, maximum, averages, sums and formulas. All of these services are done on a scheduled basis. A user may establish a schedule for each of these services with the exception of summary point services. Summary point calculations can be done on a daily basis.

Report server 104 further comprises database 940, such as an SQL relational database. In an alternative embodiment, database 940 may be an object-oriented database. Database 940 is comprised of code modules 942 such as stored procedures and schedules or data tables 944 stored in database 940 along with report template layouts and point data. Code modules 942 are executed when needed by clients 103a–103e and services such as report generator 920 to retrieve formatted data. Schedules 944 are entries in a database table that are used to execute code modules 942 or start services based on dates and times. Code is provided in the database 940 that executes certain commands at certain times based on schedules or based upon trend events that trigger the creation of reports.

Clients 103a–103e are connected to gateway 910 through MLN 113. Clients 103a–103e are provided with report manager 951 and adobe acrobat software 953, in a preferred embodiment, to generate reports and to digitally authenticate and digitally sign such reports. Clients 103a–103e are further provided with a user interface 955. Report generator 920 is connected to gateway 910 and is provided to generate reports. Report generator 920 generates reports that report manager 951 of client 103a–103e defines and is later able to open and view. Reports created by report generator 930 may be stored in file storage 935. Such reports may be created in a PDF or HTML format, depending upon the needs of the user.

As shown in FIG. 9, workstation 102 is operatively connected to gateway 910 of report server 104 through file share 960 and data importer 920. Over period of time trend data from different points are generated. For example, the workstation 102 may send information to the report server 104 retrieved from point 109a, for example, every fifteen minutes to be stored in database 940 through gateway 910. Such information includes, but is not limited to historical data, error data, trend data and other logged events from points. Reports can then be based on point values stored in database 940.

Gateway 910 provides communication between clients 103a–103e and the database 940 over a network connection 113. The gateway 910 handles securities, number of connections, and includes start procedures that are interfaced with the gateway commands can be run on a client 103a–103c. Commands from gateway 910 will execute for example points commands being stored in database 940. This will allow a client 103a–103c, for example, to see what the monthly summary is for a particular point. A client report manager 951 will connect to gateway 910 through network connection 113, allowing client 103a–103c to retrieve information about one or more points for a given period of time from database 940 so that the client 103a–103c can prepare a report based upon information stored in database 940 about one or more points.

Referring now to FIG. 10, there is depicted another flowchart, generally designated 1100, of an exemplary manner of operation of the subject invention. It should be appreciated that the manner of operation depicted in the flowchart 1100 of FIG. 10 is only exemplary of one manner in which the subject invention functions. Other manners, as well as additional steps, less steps, or modified steps constitute valid functioning of the subject invention in accordance with the present principles.

The flowchart 1100 begins with step 1105. In step 1105, the user interface 126 receives a user request to set parameters for when to begin to collect trending data for a particular point in system 100, and when to end the collection of trending data for the same point. The parameters are then stored in data storage 130 in the TrendTriggerList class 390, which is provided to keep track of the trigger point. Thereafter, in step 1100, a user request to collect trending data for the point for which data collection parameters were set in step 1105 is received by the user interface 126. As previously noted, a user can immediately instruct the field panel 106a to begin collecting trend data for the point, or the user can program the program instructions 140 to begin trending at a future time. In step 1115, based upon either a user request at the user interface 126, or based upon program instructions 140, the processing circuitry 122 instructs the field panel 106a to begin collecting trend data for a point in system 100. In step 1120, the trend data collected by the field panel 106a is temporarily stored in buffer 132. In step 1125, the field panel will continue to store trend data in buffer 132 until the buffer 132 is a certain percentage full. In one embodiment, a user, using interface 126, can select how full the buffer 132 can be before the trend data in the buffer 132 is uploaded to the workstation 102. In step 1130, processing circuitry 122 instructs the field panel 106a to upload the trend data temporarily stored in buffer 132 to the workstation 102. Once the trend data is uploaded to the workstation 102, it is stored in database 940. In step 1135, using report generator 930, a report can be generated for the trended data. Because user parameters have been set for the collection of trend data, the ultimate report generated does not contain unwanted information, since the user has been able to select the parameters for data collection. In step 1140, using report manager 951 and adobe acrobat software 953, the user at workstation 102 or at client 103a–103c can then digitally authenticate and/or digitally sign the report so that it can be used for compliance with FDA regulations. Further information about the digital authentication and/or digital signature process is discussed in co-pending application Ser. No. 10/465,150, which is incorporated by reference herein.

It will be appreciated that the above-described embodiments are merely exemplary, and that those of ordinary skill in the art may readily devise their own implementations and modifications that incorporate the principles of the present invention and fall within the spirit and scope thereof.

We claim:

1. A method of operating a building control system, the method comprising the steps of:
  receiving user generated parameters for collecting trend data at a field panel of the building control system, wherein the user generated parameters for collecting trend data at a field panel of the building control system comprise parameter for instructing the field panel when to begin collecting trending data after a predetermined trend event has occurred and a parameter for instructing the field panel when to stop collecting trending data after said predetermined trend event has occurred
  storing trended data collected by said field panel regarding said user generated parameters at the field panel; and
  transmitting the stored trended data regarding the user generated parameters at the field panel to a workstation.

2. The method of claim 1, wherein the step of storing trended data collected by said field panel based upon said user generated parameters includes temporarily storing said trended data at the field panel.

3. The method of claim 2, wherein the trended data collected relating to the user generated parameters are temporarily stored in a buffer.

4. The method according to claim 3, further comprising, prior to transmitting the stored data, receiving a user instruction to transmit the stored trended data temporarily stored in a buffer when a user selected percentage of the buffer is full.

5. The method of claim 1, wherein the step of receiving user generated parameters for collecting trend data at a field panel includes receiving user generated parameters for collecting trend data at field panel via a user interface of the field panel.

6. The method of claim 1, further comprising, after transmitting the stored trend data:
generating a report comprising the trend data collected based upon the user parameters; and
digitally authenticating said report.

7. The method according to claim 1, further comprising, before storing trended data collected by said field panel regarding said user generated parameters at the field panel:
storing user instructions for collecting trend data for a point in program instructions in the field panel.

8. The method according to claim 1, wherein the predetermined trend event is a change of value for a point in the building control system.

9. The method according to claim 1, wherein the predetermined trend event is a timed instruction stored in memory in the field panel for triggering the collection of trending data for a point.

10. The method according to claim 1, wherein the field panel further comprises an object-oriented database.

11. The method according to claim 10, wherein a plurality of user generated parameters for a collecting trending data for a plurality of points in said building control system are stored in said object-oriented database.

12. The method according to claim 1, further comprising, before storing trended data collected by said field panel regarding said user generated parameters at the field panel:
receiving a user request to begin collecting trend data for a point in said building control system.

13. A building control system comprising:
a workstation; and
a field panel in communication with the workstation;
the field panel operative to receive user generated parameters for collecting trend data at a field panel of the building control system, store trended data collected by said field pane regarding said user generated parameters at the field panel, and transmit the stored trended data regarding the user generated parameters at the field panel to the workstation, wherein the user generated parameters for collecting trend data at a field panel of the building control system comprise a parameter for instructing the field panel when to begin collecting trending data after a predetermined trend event has occurred and a parameter for instructing the field panel to stop collecting trending data after said predetermined trend event has occurred.

14. The system of claim 13, wherein the field panel is further operative to temporarily store trended data collected by said field panel based upon said user generated parameters includes temporarily storing said trended data at the field panel.

15. The system of claim 14, wherein the trended data collected by said field panel based upon said user generated parameters data is temporarily stored in a buffer.

16. The system according to claim 15, wherein the field panel is further operative to transmit the stored trended data temporarily stored in a buffer when a user selected percentage of the buffer is full.

17. The system according to claim 13, further comprising a report server, wherein the workstation is operable to transmit trend data to the report server such that the trend data can be generated into a report.

18. The system according to claim 17 further comprising a client operably connected to the report server, wherein the client is operable to digitally authenticate reports generated by the report server.

19. The system according to claim 18, wherein the field panel is provided with a user interface for receiving said user generated parameters.

20. The system of claim 19, wherein the predetermined trend event is a change of value for a point in the building control system.

21. The system according to claim 20, wherein the predetermined trend event is a timed instruction stored in memory in the field panel for triggering the collection of trending data for a point.

22. The system according to claim 21, wherein the field panel further comprises an object-oriented database.

23. The system according to claim 22, wherein the field panel is operable to store in said object-oriented database a plurality of user generated parameters for a collecting trending data for a plurality of points in said building control system.

24. The system according to claim 13, wherein the field panel is operable to receive a user request to begin collecting trend data for a point in said building control system.

25. The system according to claim 13, wherein the field panel is operable to store user instructions for collecting trend data for a point in program instructions in the field panel.

* * * * *